Patented Feb. 6, 1951

2,540,356

UNITED STATES PATENT OFFICE 2,540,356

SULFONAMIDE DERIVATIVES

James M. Sprague, Drexel Hill, Pa., assignor to Sharp & Dohme, Incorporated, Philadelphia, Pa., a corporation of Maryland No Drawing. Application March 12, 1949, Serial No. 81,209

6 Claims. (Cl. 260—239.75)

This invention relates to new pyrimidine derivatives of sulfanilamide in which the pyrimidyl radical is linked through its 4-position carbon atom to the nitrogen atom of the sulfonamido group, and is further substituted on its 2-position carbon atom by an alkoxy or alkylthio radical.

The new products of this invention are in general therapeutically useful in varying degrees and applications, and particularly in combatting infections in man or other animals.

The product of the invention may be represented by the general formula

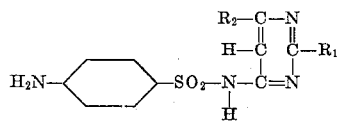

in which $R_1$ is an alkoxy or an alkylthio radical, in which the alkyl group is a low molecular weight hydrocarbon having up to, for example, four carbon atoms; and $R_2$ is hydrogen or a low molecular weight alkyl radical having up to, for example, four carbon atoms. It is to be understood, however, that the hydrogen attached to the 5-position carbon of the pyrimidyl radical may be replaced by any other suitable radical, such as a lower alkyl, or a halogen radical, or the like, as also may the hydrogen attached to the sulfonamido nitrogen which may be replaced by any suitable positive radical. Likewise the amino radical attached to the benzene nucleus may be replaced by any radical hydrolyzable or reducible to an amino radical, such as, for example, an acylamino or a nitro radical.

The products of this invention are generally prepared by condensing a 4-amino derivative of the selected pyrimidine compound with an acyla-nitrophenylsulfonyl halide or with a nitrobenzenesulfonyl halide, and splitting off hydrogen halide, the reaction being carried out in a suitable solvent, such as pyridine in the presence of the selected 4-amino-pyrimidine compound.

The preparation of new products embraced by this invention is illustrated by, but not restricted to, the following examples:

*Example I.—2-ethoxy-4-sulfanilamidopyrimidine*

9.36 grams (0.04 mole) of para-acetylaminobenzenesulfonyl chloride was added to 5.6 grams (0.04 mole) of 2-ethoxy-4-aminopyrimidine in 40 cc. of pyridine. The solution was warmed on a steam bath for about one and one-half hours, and the pyridine then was removed by vacuum distillation. The residue was dissolved in dilute alkali, treated with "Darco" decolorizing charcoal, and acidified with acetic acid. The acetyl derivative obtained, after two recrystallizations from dilute acetic acid, melted at 278–279° C.

3.3 grams of the acetyl derivative was added to 50 cc. of 10% aqueous sodium hydroxide and warmed on a steam bath for 2–3 hours. The solution was then cooled and neutralized yielding 2-ethoxy-4-sulfanilamidopyrimidine, which after repeated reprecipitations from dilute hydrochloric acid and recrystallization from dilute alcohol, melted at 256.5° C.

*Example Ia.—2-ethoxy-4-sulfanilamidopyrimidine*

9.6 grams (0.043 mole) of para-nitrobenzenesulfonyl chloride was added, very slowly, over a period of about an hour, to 6.0 grams (0.043 mole) of 2-ethoxy-4-aminopyrimidine dissolved in 40 cc. of cold, dry pyridine. An insoluble phase separated during the addition of the sulfonyl chloride. After being maintained in the cold overnight, more of the insoluble phase separated. The suspension was heated on a water bath for about an hour, then on a steam bath for about half an hour. The pyridine was then removed by vacuum distillation and the residue treated with 50 cc. of water. The water was removed by vacuum distillation. The solid residue was dissolved in dilute potassium hydroxide, the insoluble material filtered off, and the 2-ethoxy-4-(para-nitrobenzenesulfonamido)pyrimidine precipitated from the filtrate upon neutralization with acetic acid. After two recrystallizations from glacial acetic acid, the nitro derivative obtained melted at 202° C. with effervescence.

1.78 grams (0.0055 mole) of the above nitro derivative was suspended in 100 cc. of alcohol with 0.5 gram of platinum oxide catalyst and was shaken in an atmosphere of hydrogen until no more hydrogen was absorbed. The catalyst was removed and the filtrate evaporated to dryness. The residue was recrystallized from a large volume of 70% alcohol, redissolved in dilute hydrochloric acid, treated with norite and precipitated with ammonium hydroxide. After recrystallization from dilute alcohol the 2-ethoxy-4-sulfanilamidopyrimidine obtained melted at 256.5° C.

*Example II.—2-ethylmercapto-4-sulfanilamidopyrimidine*

3.1 grams (0.02 mole) of 2-ethylmercapto-4-aminopyrimidine was dissolved in 20 cc. of anhydrous pyridine. 5 grams of para-acetylaminobenzenesulfonyl chloride was added in small portions at room temperature, and the mixture allowed to stand at the same temperature for two days. The pyridine was removed by vacuum distillation, and the residue treated with dilute sodium hydroxide, then with "Darco" decolorizing charcoal, and acidified. The mixture was filtered, and the gummy residue obtained allowed to stand overnight at −20° C. The residue was then treated with ammonium hydroxide and then neutralized with acetic acid. The 2-ethylmercapto-4-(para-acetylaminobenzenesulfonamido) - pyrimidine thus obtained, after three recrystallizations from alcohol and water and then being dried under vacuum at 150° C., melted at 211–212° C.

5 grams of the acetyl derivative was dissolved in 50 cc. of 10% aqueous sodium hydroxide and warmed on a steam bath for forty-five minutes. The solution was then cooled, decolorized, and neutralized. The 2-ethylmercapto-4-sulfanilamidopyrimidine thus obtained, after being recrystallized from alcohol and then from alcohol and benzene melted at 67–71° C. A sample of this product was dehydrated by heating on an oil bath at 120° C. for about ten minutes. A glass was obtained which was triturated with ether and allowed to stand for five days. The product crystalized as colorless, prismatic needles, melting at 132–133.5° C.

*Example III.—2-ethoxy-4-sulfanilamido-6-methylpyrimidine*

18 grams of para-acetylaminobenzenesulfonyl chloride was added in small portions to a solution of 10.8 grams (0.071 mole) of 2-ethoxy-4-amino-6-methyl pyrimidine in 100 cc. of dry pyridine at room temperature. After standing at room temperature for 3–5 days, the pyridine was removed by vacuum distillation. The residue was dissolved in dilute alkali, treated with "Darco" decolorizing charcoal, and acidified with acetic acid. The 2 - ethoxy - 4-(para-acetylaminobenzenesulfonamido)-6-methylpyrimidine monohydrate melted at 161–162° C. The anhydrous material melted at 200–201° C.

13.5 grams of the acetyl derivative was added to 50 cc. of 10% aqueous sodium hydroxide and warmed on a steam bath until a test sample was found to be acid soluble. The solution was then cooled, decolorized and neutralized. The precipitate was collected on a filter and reprecipitated from alkali and then from acid. After two additional recrystallizations from aqueous alcohol, 2-ethoxy-4-sulfanilamido-6-methylpyrimidine was obtained, melting at 186–187° C.

*Example IV.—2-ethylmercapto-4-sulfanilamido-6-methylpyrimidine*

13.3 grams of 2 - ethylmercapto - 4-amino-6-methylpyrimidine was dissolved in 75 cc. of dry pyridine. 19 grams of para-acetylaminobenzenesulfonyl chloride was added slowly over a period of about one hour. After standing at room temperature for three days, the pyridine was removed by vacuum distillation. The residue was taken up in dilute alkali, treated with "Darco" decolorizing charcoal, and acidified with acetic acid. The 2-ethylmercapto - 4 - (para-acetylaminobenzenesulfonamido) -6-methylpyrimidine obtained, after two recrystallizations from alcohol and water, melted at 208–209° C.

20 grams of the acetyl derivative was added to 100 cc. of 10% aqueous sodium hydroxide. The solution was warmed on a steam bath until a sample was found to be soluble in excess hydrochloric acid. The solution was removed from the steam bath, cooled, decolorized and neutralized to precipitate the free base. After recrystallization from alcohol and water, the 2-ethylmercapto-4-sulfanilamido-6-methylpyrimidine melted at 188–189° C.

The general description of the invention shows that it is not limited to those compounds above specifically illustrated and identified. From the general formula it is seen that the products of the invention may be considered as consisting of three essential portions. Each of the three portions, that is the benzenesulfonyl portion, the pyrimidyl portion, and the imino portion (to which both the benzenesulfonyl and pyrimidyl radicals are attached), may contain substituents other than those specifically illustrated in the examples. Thus, by replacing the hydrogen attached to the middle imino nitrogen by any other radical, such as a sodium radical or an alkyl radical, or by replacing the hydrogen attached to the 5-position carbon of the pyrimidyl radical by an alkyl or a halogen radical, such as the bromine radical and the like, additional compounds are obtained which are embraced within the scope of this invention. All of these compounds, as well as their homologues and isomers, may be prepared by substantially the same method as described in Examples I through IV, and are to be included as a portion of this disclosure without listing separately the individual names, all of which are readily apparent as each individual structure with the selected substituent or substituents is drawn.

As various other embodiments of the invention will occur to those skilled in the art, it is not intended that the scope of the patent be limited except as is required by the prior art and the appended claims.

All melting points given in this specification are uncorrected.

This application is a continuation-in-part of my co-pending patent application Serial No. 472,156, filed January 12, 1943, now U. S. Patent No. 2,494,524, issued January 10, 1950, which application was in part a continuation of both application Serial No. 361,106, filed October 14, 1940, now U. S. Patent No. 2,407,966, issued September 17, 1946, and my joint application with another, Serial No. 287,936, filed August 2, 1939, now abandoned.

I claim:

1. A 4-sulfanilamido-pyrimidine of the general formula

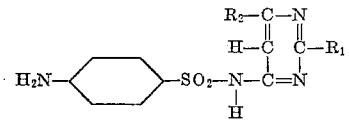

wherein $R_1$ is selected from the group consisting of alkoxy and alkylthio radicals, in which the alkyl group is a low molecular weight hydrocarbon; and $R_2$ is selected from hydrogen and a lower alkyl radical.

2. A 4-sulfanilamido-pyrimidine of the general formula

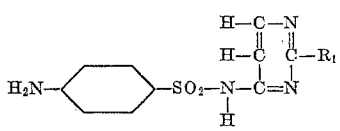

wherein $R_1$ is an alkylthio radical in which the alkyl group is a low molecular weight hydrocarbon.

3. A 4-sulfanilamido-pyrimidine of the general formula

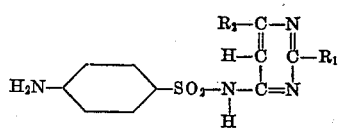

wherein $R_1$ is an alkylthio radical in which the alkyl group is a low molecular weight hydrocarbon, and $R_2$ is a lower alkyl radical.

4. A 4-sulfanilamido-pyrimidine of the general formula

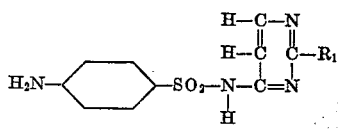

wherein $R_1$ is an alkoxy radical in which the alkyl group is a low molecular weight hydrocarbon.

5. A 4-sulfanilamido-pyrimidine of the general formula

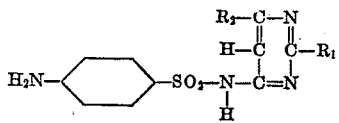

wherein $R_1$ is an alkoxy radical in which the alkyl group is a low molecular weight hydrocarbon, and $R_2$ is a lower alkyl radical.

6. 2 - ethoxy-4-sulfanilamido-6-methyl pyrimidine.

JAMES M. SPRAGUE.

REFERENCES CITED

The following references are of record in the file of this patent:

UNITED STATES PATENTS

| Number | Name | Date |
|---|---|---|
| 2,312,691 | D'Alelio | Mar. 2, 1943 |
| 2,403,713 | English | July 9, 1946 |
| 2,407,966 | Sprague | Sept. 17, 1946 |
| 2,430,439 | Winnek et al. | Nov. 4, 1947 |

FOREIGN PATENTS

| Number | Country | Date |
|---|---|---|
| 114,821 | Australia | Mar. 3, 1942 |

OTHER REFERENCES

Sprague et al.: J. Amer. Chem. Soc., vol. 63, (1941), pp. 3028–3030.

Backer et al.: Rec. trav. Chem., vol. 64 (1945), p. 116.

Certificate of Correction

Patent No. 2,540,356 February 6, 1951

JAMES M. SPRAGUE

It is hereby certified that error appears in the printed specification of the above numbered patent requiring correction as follows:

Column 4, line 62, after the word "from" insert *the group consisting of*; and that the said Letters Patent should be read as corrected above, so that the same may conform to the record of the case in the Patent Office.

Signed and sealed this 21st day of August, A. D. 1951.

[SEAL]

THOMAS F. MURPHY,
*Assistant Commissioner of Patents.*